United States Patent
Mathieu

(10) Patent No.: US 7,404,524 B2
(45) Date of Patent: Jul. 29, 2008

(54) TRACTION AID DEVICE

(75) Inventor: Serge Mathieu, Rosemère (CA)

(73) Assignee: Danielle Dumont, Oka (Quebec) (CA)

( * ) Notice: Subject to any disclaimer, the term of this patent is extended or adjusted under 35 U.S.C. 154(b) by 141 days.

(21) Appl. No.: 11/359,590

(22) Filed: Feb. 23, 2006

(65) Prior Publication Data

US 2007/0193668 A1   Aug. 23, 2007

(51) Int. Cl.
*E01B 23/00* (2006.01)

(52) U.S. Cl. ..................................................... 238/14

(58) Field of Classification Search .................. 238/14, 238/10 R
See application file for complete search history.

(56) References Cited

U.S. PATENT DOCUMENTS

| 1,425,101 | A | * | 8/1922 | Jury | ............................ | 238/14 |
| 3,878,988 | A | * | 4/1975 | Blais | ........................... | 238/14 |
| 4,300,722 | A | | 11/1981 | Simmons | | |
| 4,568,020 | A | | 2/1986 | Gallicham | | |
| 5,439,171 | A | | 8/1995 | Fruend | | |
| 5,538,183 | A | | 7/1996 | McGee | | |
| 6,129,289 | A | * | 10/2000 | Morin, Jr. | ..................... | 238/14 |

* cited by examiner

*Primary Examiner*—Mark T Le
(74) *Attorney, Agent, or Firm*—Equinox Protection; Franz Bonsang, Patent Agent

(57) ABSTRACT

A traction aid for providing traction to a wheel of a vehicle relative a ground surface has two sections, composed of side members and traction members, connected by a connecting mechanism enabling pivotal unfolding and folding of sections between folded and unfolded configurations for device. In unfolded configuration, sections are longitudinally opposed end-to-end to allow wheel to pass over both sections when device is deployed on ground surface. In folded configuration, sections are folded together and extend substantially parallel one another. Each section has a plurality of gripping members attached to side members and extending therefrom. Each gripping member is configured such that, when device is deployed in unfolded configuration on ground surface, gripping member extends theretowards for grippingly protruding thereinto, gripping member otherwise, for folded configuration, extending towards an adjacent side member of another section, the adjacent side member extending therebeyond to impede gripping member from engaging foreign objects.

19 Claims, 3 Drawing Sheets

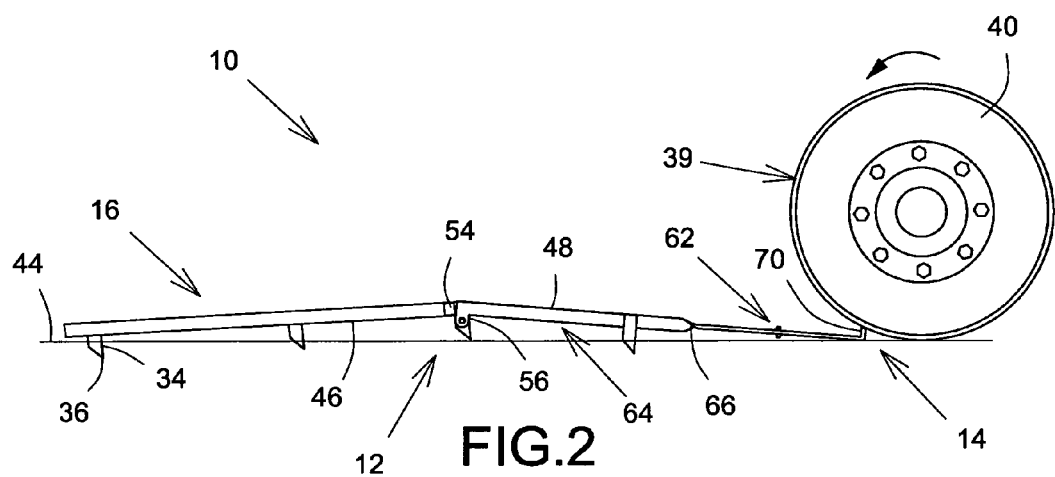
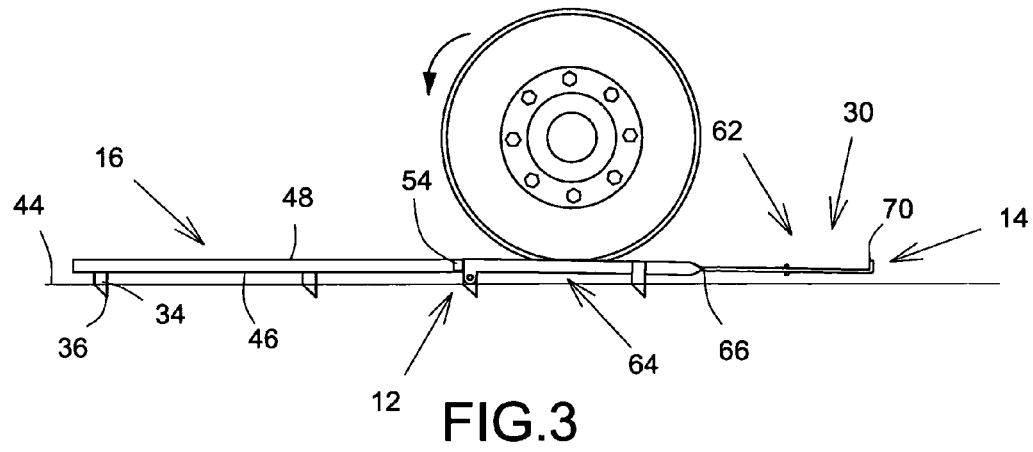

TRACTION AID DEVICE

FIELD OF THE INVENTION

The present invention concerns traction aid devices and more particularly a traction aid device for providing traction to a wheel of a vehicle to assist in extracting the same out of the snow, sand, ice, mud, or the like.

BACKGROUND OF THE INVENTION

As is known, traction aids are often used for extracting a motorized vehicle car trapped in the ground due to the presence on the ground of snow, ice or the like in which a wheel, often having a tire placed thereon, of the vehicle is trapped. In use, a typical traction aid is placed on the ground, notably the snow, ice, mud or the like, in front of the wheel in the forward acceleration mode and at the rear of the tire for rearward acceleration. The forward acceleration or rearward acceleration of the wheel causes the wheel to pass over the traction aid, which typically has traction members or means which are engaged by wheel for providing traction thereto relative the ground, and especially the snow, ice, mud, or the like thereon, and allows the wheel, and therefore the vehicle, to pass therethrough until the tire, and eventually the vehicle is extracted therefrom. Such traction aids also often have gripping members or means, such as spikes or the like, extending from a ground side thereof, situated generally opposite a side thereof engaged by the wheel. These gripping members protrude into the ground, including the snow, ice, mud, or the like, thereby gripping the ground while the wheel passes over the traction aid device. Thus, the gripping members impede displacement of the traction aid device by the by the forward acceleration or rearward acceleration of the wheel while the wheel passes over the device and engages the traction members. Accordingly, the gripping members facilitate maintaining the device in one place and provision of traction to the wheel.

While typical traction aid devices are highly useful when deployed to provide traction, they can often be space consuming when stored and cumbersome to transport. For example, U.S. Pat. No. 3,878,988 discloses a traction aid device that has traction members, for providing traction, extending between two side members and gripping members, namely spikes, extending from the side members gripping the ground. However, when not in use, the traction aid remains in the same configuration as when the traction aid is in use. Accordingly, the space occupied by the traction aid cannot be reduced, thus eliminating the possibility of compact storage of the traction aid. Further, the traction aid must be transported and stored with the spikes protrudingly outward therefrom, which may be cumbersome, and even dangerous, as there is a risk the spikes will engage a foreign object or a person, possibly resulting in damage or injury.

U.S. Pat. No. 4,568,020 teaches a traction aid device formed by a plurality of interlocking U-shaped frames which form traction members and which have, on a ground side thereof, a plurality of teeth as gripping members. Each U-shaped frame is pivotally connected to a slightly smaller U-shaped frame foldable thereinto. Thus, the traction aid, when not in use, can be retracted into a compact storage configuration. Disadvantageously, however, the teeth of the traction aid device continue to protrude outwardly from the ground end of each remain U-shaped section when the traction aid device is in the storage configuration. Accordingly, the risk that the spikes will engage a foreign object or a person, possibly resulting in damage or injury, persists.

U.S. Pat. No. 5,538,183 discloses a traction aid having a plurality of panels that are hingeably and/or pivotally connected to each other, with fasteners for attaching gripping members to a ground side thereof and traction members inset into a recess on extending on a traction side opposite the ground side. To use the device, gripping members are attached to fasteners and device is placed on the ground, which is gripped by gripping members, and the wheel of the vehicle passes thereover. The device may be placed in a compact folded configuration by removing the gripping members, namely cleats, and folding the panels toward each other such that the traction sides face away from each other and the ground sides face towards each other. Accordingly, in the folded configuration, the gripping members, having been removed, do not protrude outwardly, which reduces the risk that the gripping members will come into contact with a foreign person. Further, the fasteners, which face toward each other in the folded configuration, also do not protrude outwardly. Disadvantageously, however, as the traction sides face outwardly in the folded configuration, there remains a risk that the traction members will come into contact and undesirably engage a foreign object or person, even with the traction members being inset into the recess. Further, placement of the device in the folded configuration requires, rather cumbersomely, removal of the gripping means, which may otherwise damage the panels in folded configuration. Gripping means must also be fastened to fasteners when the device is unfolded from folded configuration for use, which may also be a cumbersome process.

Accordingly, an improved traction aid device is required that obviates the above-mentioned difficulties.

SUMMARY OF THE INVENTION

It is an object of the present invention to provide an improved traction aid device.

An advantage of the present invention is that the traction aid device provided thereby may be compactly and easily stored and moved.

A further advantage of the present invention is that the traction aid device may be stored and moved with reduced risk of damage to foreign objects and persons.

Yet another advantage of the present invention is that the traction aid device may be deployed on ground surface with a reduced risk of damage to a wheel and vehicle during passage of wheel and vehicle thereover.

In one aspect the present invention provides a traction aid device for a wheel of a vehicle, the device comprises:

two generally planar sections, each section having two respective side members with at least one respective traction member extending therebetween and engageable by a wheel to provide traction thereto relative a ground surface;

connecting means pivotally connecting said sections to one other and enabling pivotal folding and unfolding thereof between, respectively, an unfolded configuration of said traction aid device, wherein said sections are unfolded end-to-end opposite one another on said surface, and a folded configuration of said traction aid device, wherein said sections are folded together;

for each respective side member of each section, at least one respective gripping member attached thereto and having a respective gripping end, said gripping member extending from said respective side member to said gripping end for grippingly protruding into said around surface in said unfolded configuration, said respective gripping end being situated, when said traction aid device is in said folded configuration, alongside an adjacent said respective side member, of the other section with the adjacent said respective side member of the other section extending beyond said gripping end; and for each respective gripping member of one said section, a respective gripping member abutment protrusion, attached to said respective gripping member intermediate said respective side member and said gripping end, for abutting said adjacent said side member when said traction aid device is in said folded configuration.

In another aspect, the present invention provides a traction aid device for a wheel of a vehicle, the device comprising:

two generally planar sections, each section having two respective side members with at least one respective traction member extending therebetween and engageable by a wheel to provide traction thereto relative a ground surface;

connecting means pivotally connecting the sections to one other and enabling pivotal folding and unfolding thereof between, respectively, an unfolded configuration of the traction aid device, wherein the sections are unfolded end-to-end opposite one another on the surface, and a folded configuration of the traction aid device, wherein the sections are folded together;

for each respective side member of each section, at least one respective gripping member attached thereto and having a respective gripping end, the gripping member extending from the respective side member to the gripping end for grippingly protruding into the ground surface in the unfolded configuration, the respective gripping end being situated, when the traction aid device is in the folded configuration, alongside an adjacent the respective side member, of the other section with the adjacent the respective side member of the other section extending beyond the gripping end, wherein each side member has opposing respective inside and outside surfaces extending between generally longitudinally opposed respective first and second side member ends thereof, the traction members extending between the respective inside surfaces and being attached thereto, and the respective gripping members are attached to the inside surface for one section and to the outside surface for another section.

In still another aspect, the present invention provides a traction aid device for a wheel of a vehicle, the device comprising:

two generally planar sections, each section having two respective side members with at least one respective traction member extending therebetween and engageable by a wheel to provide traction thereto relative a ground surface, each side member having opposing respective inside and outside surfaces extending between generally longitudinally opposed respective first and second side member ends thereof each respective traction member extending between the respective inside surfaces and being attached thereto;

connecting means pivotally connecting the sections to one other and enabling pivotal folding and unfolding thereof between, respectively, an unfolded configuration of the traction aid device, wherein the sections are unfolded end-to-end opposite one another on the surface, and a folded configuration of the traction aid device, wherein the sections are folded together; and for each respective side member of each section, at least one respective gripping member attached thereto and having a respective gripping end, the gripping member extending from the respective side member to the gripping end for grippingly protruding into the ground surface in the unfolded configuration, the respective gripping end being situated when the traction aid device is in the folded configuration, alongside an adjacent respective side member, of the other section with the adjacent respective side member of the other section extending beyond the gripping end; and at least one stopper protrusion protruding outwardly from the respective outside surface of one respective first side member end of one respective side member, the stopper protrusion abutting the respective first end of an adjacent respective side member of another section when the sections are in the unfolded configuration for preventing, when the traction aid device is in the unfolded configuration, further pivotal unfolding of the sections beyond the unfolded configuration.

Other objects and advantages of the present invention will become apparent from a careful reading of the detailed description provided herein, with appropriate reference to the accompanying drawings.

BRIEF DESCRIPTION OF THE DRAWINGS

Further aspects and advantages of the present invention will become better understood with reference to the description, provided for purposes of illustration only, in association with the following figures, wherein:

FIG. 2 is a perspective view of the traction aid device shown in FIG. 1 in unfolded configuration, illustrating initial engagement of a wheel thereupon;

FIG. 3 is a side plan view of the traction aid device shown in FIG. 1 in unfolded configuration, illustration passage of wheel thereover;

DETAILED DESCRIPTION OF THE PREFERRED EMBODIMENTS

Figure 1:
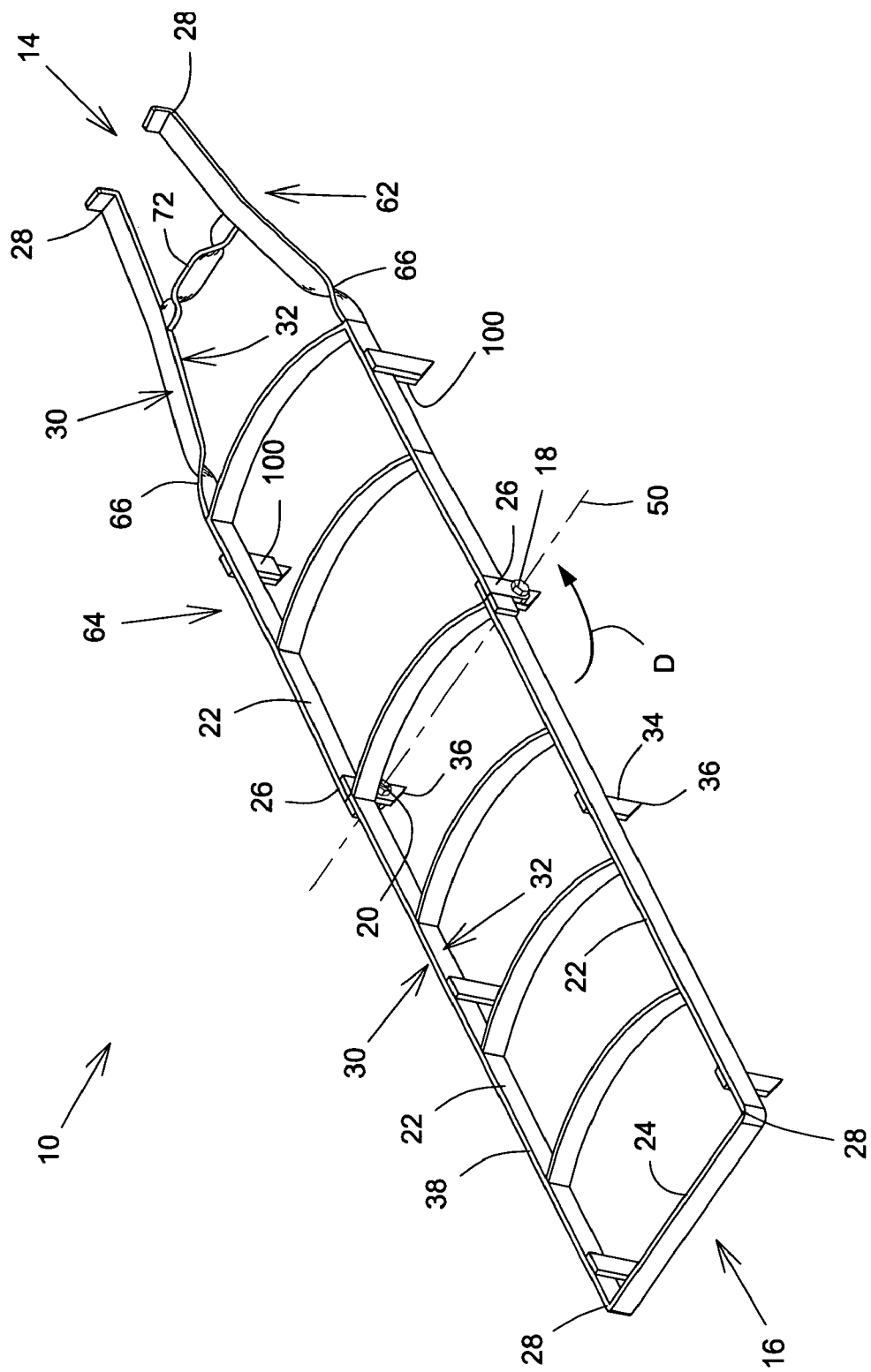
FIG. 1 is a perspective view of a traction aid device, in accordance with an embodiment of the present invention, in an unfolded configuration.

Reference is now made FIG. 1, a perspective view of the traction aid device, shown generally as 10, of an embodiment of the invention in an unfolded configuration therefor, shown generally as 12. Device 10 has two generally planar sections, shown generally as first section 14 and second section 16, which are pivotably foldably connected by connecting means, shown as bolts 18. Each section 14, 16 has two elongated respective side members 22, with each respective side member 22 having a first, i.e. proximal, side member end 26 situated proximal to connecting means 18 and a generally longitudinally opposed second, i.e. distal, side member end 28, situated distal the connecting means 18. Further, for each section 14, 16, there is at least one respective traction member 24 extending between the respective side members 22 thereof for engagement by a wheel of the vehicle to provide traction thereto when the wheel passes over section 14, 16. More specifically, for each section 14, 16, each respective side member 22 thereof has a respective inside surface 30 extending longitudinally between the respective side member ends 26, 28 thereof and which faces the respective inside surface 30 of the other respective side member 22 thereof. It is between these respective inside surfaces 30 that each respective traction member 24 of section 16, 18 extends and to which each respective traction member 24 is attached. Each side member 22 also has a respective outside surface 32, also extending longitudinally between the respective side member ends 26, 28 thereof. Respective outside surface 32 of a side member 22 and is generally opposed to inside surface 30 thereof, and the respective outside surfaces 32 for both side members 22 of each section 14, 16 generally face away from each other.

Reference is now made to FIG. 1 in conjunction with FIGS. 2 and 3. FIGS. 2 and 3 together demonstrate passage of a wheel 40, which may include a tire, of a vehicle, not shown, over device 10, when device is deployed on a ground surface 44 for providing traction to the wheel 40 relative the ground surface 44 while wheel 40 over sections 16, 18 of device 10. When device is in unfolded configuration 12, sections 16, 18 are pivotally unfolded, relative one another via connecting means and extend longitudinally end-to-end opposite one another. More specifically, in unfolded configuration 12 respective second side member ends 28 are distally disposed generally longitudinally opposite one another.

For each respective side member 22 of each section 14, 16, there is at least one respective gripping member 34 securely attached thereto and extending therebeyond substantially parallel inside and outside surfaces 30, 32 thereof. More specifically, each respective gripping member 34 extends from the respective side member 22 to which the gripping member 34 is attached and therebeyond to a respective gripping end 36 of gripping member 34. Gripping end 36 extends beyond a respective ground surface side 46 of the respective section 14, 16 composed of the respective side member 22 and which faces the ground surface 44 when the device 10 is deployed in unfolded configuration 12 thereupon. Gripping end 36 is configured such that, when device 10 is deployed in unfolded configuration 12 on ground surface 44, gripping end 36 penetrates ground surface 44, thereby allowing gripping member 34 and gripping end 36 to grippingly protrude into ground surface 44 while wheel 40 passes over sections 16, 18, i.e. respective side members 22 and traction members 24 respective, on respective wheel surfaces 48 thereof, which are generally opposed to the ground surface sides 46. Accordingly, gripping members 34 and their respective gripping ends 36 are configured for facing ground surface 44 and grippingly protrude thereinto when device 10 is deployed in unfolded configuration 12 thereupon. While gripping members 34 are generally shown as spikes 34 having pointed spike ends 36 for gripping ends 36, any structures and/or member capable of grippingly penetrating and protruding into ground surface 44 and maintaining device 10 in place while wheel 40 passes thereupon may be deployed as gripping members 34.

Since sections 14, 16 are disposed end-to-end in unfolded configuration 12 and gripping members 34 and ends 36 are configured to face and grippingly protrude into ground surface 44 when device 10 is deployed thereupon in unfolded configuration 12, wheel 40 can pass, i.e. roll or be rollingly propelled, over device 10 from first section 16 to second section 18 on respective wheel surface sides 54. Wheel surface sides 54 of sections 14, 16 are engaged by wheel surface 39 of wheel 40 and are disposed generally opposite ground surface sides 46. As wheel 40 passes over sections 14, 16, the mass of wheel 40, as well as of vehicle, will exert a force directing the gripping members 34 and gripping ends 36 towards ground surface 44 for grippingly protruding therein, thus gripping device 10 in place relative ground surface 44. At the same time, traction members 24 are engaged by wheel 40 and provide traction thereto while wheel 40 traverses sections 14, 16 of device 10 over ground surface 44 upon which device 10 is deployed and grippingly held in place by gripping members 34.

As best shown in FIG. 2, when wheel 40 first engages first section 14, on respective second side member ends 28 thereof, the force exerted by mass thereof on second side member ends 28 of first section 14, may cause a portion of first section 14 extending towards first side member ends 26 of first section 14, as well as a portion of second section 18, to move away from ground surface 44, possibly withdrawing one or more gripping members 34 from ground surface. However, as best shown in FIG. 3, as wheel 40 passes further over first section 14 towards second section 16, force exerted by mass thereof will direct substantially all of first and second sections 14, 16, including gripping members 34 and their respective gripping ends 36, back towards ground surface 44 such that gripping members 34 and their respective gripping ends 36 grippingly protrude into ground surface 44 as wheel 40 passes thereover.

Reference is again made to FIGS. 1, 2, and 3. To better ensure that wheel 40 is able to engage traction members 24, each traction member 24 is, preferably, configured, e.g. positioned, sized, or shaped, such that at least a portion thereof, extends upwardly away from ground surface 44, i.e. relative thereto, at an angle substantially perpendicular thereto when device 10 is deployed on ground surface 44 in unfolded configuration 12. Traction members 24 may, alternatively, be configured such that a portion of each traction member 24 extends upwardly away from ground surface 44 at other angles relative thereto when device 10 is disposed on ground surface 44 in unfolded configuration 12 and could even extend parallel to ground surface 44. However, the perpendicular orientation of traction member 24 relative ground surface 44 remains preferable as it helps to ensure that at least a portion of traction member 24 extends as far away as possible from ground surface 44 which, in turn, helps to ensure that at least a portion of traction member 24 always extends above ground surface 44 and remains engageable by wheel 40. This aspect of the invention is particularly useful when ground surface 44 is a malleable surface, such as mud or snow, into which device 10 may easily sink under mass of wheel 40 and vehicle.

For the same reasons, while side members 22 may be configured to be parallel to ground surface 44, i.e. with surfaces 30, 32 extending parallel thereto, it is generally preferable that side members 22 extend upwardly away therefrom, i.e. relative thereto, at an angle substantially perpendicular thereto. Further, configuration of side members 22 as shown, with outside and inside surfaces 30, 32 extending substantially perpendicularly upwardly away from ground surface 44 facilitates attachment of traction members 24 and gripping members 34 to a larger surface area of the surfaces 30, 32, thus rendering such attachment more secure and robust. This is particularly the case when traction members are configured to extend upwardly and perpendicularly away from ground surface 44, as explained above, when device 10 is in unfolded configuration 12.

While gripping members 34 are preferably attached at surfaces 30, 32 of their respective side members 22, they may also be attached at side member edges 28 extending between surfaces 30, 32 and defined thereby. Additionally, while gripping members 34 are shown in FIGS. 1 and 2 as being attached to outside surfaces 32 of side members 22 for first section 14 or to inside surfaces 30 for second section 32, other configurations for attachment of gripping members 34 are possible. For example, depending on connection means deployed and spacing between side members 22 of first section 14 and adjacent side members 22 situated adjacent and connected thereto of second section 16, gripping members 34 may be attached, for both sections 14, 16, to either surface 30, 32.

To better ensure that traction members 24 and gripping members 34 are securely attached, for each side member 22, respective gripping members 34 and traction members 24 are attached thereto longitudinally spaced apart one another. Accordingly, for each side member 22, gripping members 34 and traction members 24 are always attached at different, spaced apart, longitudinal positions along the length of side member 22, regardless of whether gripping members 34 are attached to inside surface 30 or outside surface 32. This spaced apart attachment of gripping members 34 relative traction members 24 ensures that stress resulting from gripping of ground surface 44 by gripping member 34 and stress resulting from engagement of traction member 24 by wheel are never simultaneously concentrated at a longitudinal position along side member 22 at which both a traction member 24 and gripping member 34 are attached. Accordingly risk of gripping members 34 and traction members 24 detaching from side members 22 is reduced.

Figure 4:
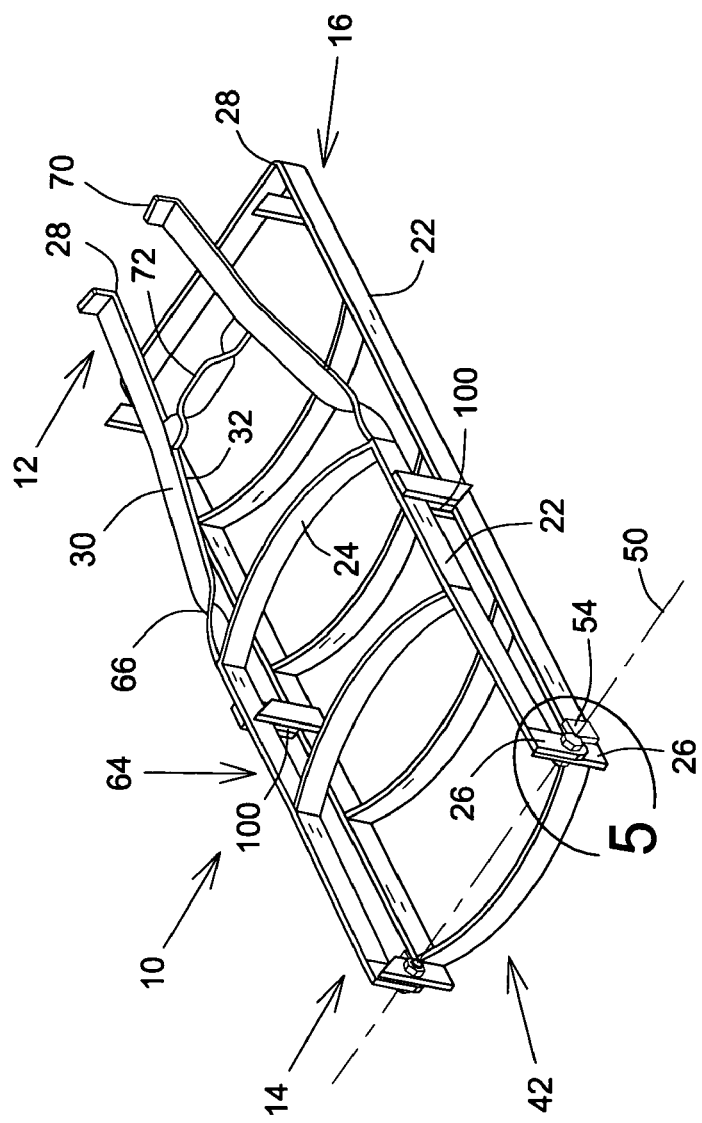
FIG. 4 is a side plan view of the traction aid device of FIG. 1 in a folded configuration.

Referring now to FIGS. 1 and 4, to ensure easy displacement and storage of device 10, sections 14, 16 are pivotally foldable and unfoldable relative one another around an axis 50 defined by connection means 18. More specifically connection means 18 pivotally connects each side member 22 of one section to a respective adjacent side member 22, situated adjacent thereto, of the other section 14, 16 in proximity to the respective proximal first side member ends 26 thereof. Accordingly, sections 14, 16 may be pivotally folded towards each other in direction D when device 10 is in unfolded configuration 12 to place device 10 in folded configuration, shown generally as 42 in FIG. 4. As best shown in FIG. 4, when device 10 is in folded configuration 42, sections 14, 16 are folded together, i.e. with distal second respective side member ends 28 of first section 14 situated proximally adjacent respective distal second side member ends 28 of second section 16, with respective side members 22 of first section 14 extending substantially parallel to respective side members 22 of second section 16. Accordingly, device 10 in folded configuration 42 extends, advantageously, longitudinally over a shorter distance than in unfolded configuration 12, which facilitates storage of device 10 in spaces where device 10 might otherwise be unable to fit in unfolded configuration 12. Placement of device 10 in folded configuration 42 may also facilitate carriage of device 10 by shorter individuals who may find carrying of device 10 in unfolded configuration 42 cumbersome.

Additionally, when device 10 is in folded configuration 42, each gripping member 34 of each section 14, 16 extends from its respective side member 22 towards its respective gripping end 36. Respective gripping end 36, in turn, protrudes towards respective adjacent side member 22 therefor, extending therebeyond and situated adjacent thereto, of the other section 14, 16. Specifically, the respective gripping member's adjacent side member 22 is situated adjacent to side member 22 to which respective gripping member 34 is attached and connected thereto by connecting means 18. Thus, each respective gripping member 34 is configured, e.g. positioned sized, and/or shaped, such that when device 10 is in unfolded configuration 12, respective gripping member 34 extends from the side member 22 to which it is attached to its respective gripping end 36 which protrudes towards ground surface 34, whereas, when device 10 is in folded configuration 42, gripping member 34 extends towards adjacent side member 22 which extends beyond gripping end 36 thereof. Accordingly, gripping member 34 is configured such that, when device 10 is in folded configuration 42, gripping member 34 and respective gripping end 36 thereof do not extend beyond adjacent side member 22. Therefore, risk that gripping member 34, and particularly gripping end 36 thereof, will accidentally come into contact with foreign objects or persons when device 10 is in folded configuration 42 is reduced.

Referring now to FIGS. 1 and 4, to further ensure that gripping ends 36 do not extend beyond adjacent side member 22, each respective gripping member 36 for one section 14, 16, shown as first section 14 for the embodiment, may, optionally, have a optional respective gripping member abutment protrusion 100 attached thereto intermediate the respective side member 22 therefor and the gripping member end 36. The gripping member abutment protrusion 100 is configured, i.e. sized and shaped, to abut adjacent side member 22 when said traction aid device 10 is in folded configuration 42 such that gripping end 36 thereof do not extend beyond adjacent side member 22.

Figure 5:
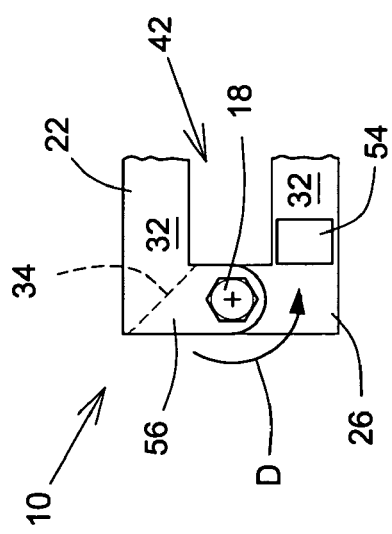
FIGS. 5 and 6 are partial side plan views of the traction aid device of FIG. 1 in folded and unfolded configuration, respectively, taken along line 5 of FIG. 4.
Figure 6:
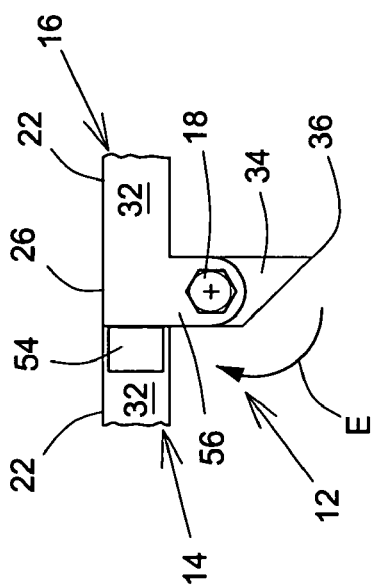

To better explain connection means, reference is now made to FIGS. 1, 5, and 6. Generally speaking, connection means 18 for the embodiment shown consists of two cylindrical bolts 18 by which adjacent side members 22 of sections 14, 16 are pivotally connected. Each bolt 18 extends through a different side member 22 of one section 14, 16, at respective first side member end 26 thereof, and adjacent side member 22 situated adjacent thereto of other section 14, 16, also at respective first side member end 26 thereof. In general, the bolt 22 extends through bolt apertures, not shown, in the respective first side member ends 26 of the side members 22 connected thereby, the bolts 18 being configured, e.g. cylindrically shaped, to permit pivotal rotation of side members 22 connected thereby through bolt apertures, thereby enabling pivotal movement, i.e. folding, of sections 14, 16. In general, bolts 18 are aligned, i.e. positioned, when extended through side members 22 to be define axis 50 around which sections 14, 16 are folded and unfolded.

Reference is again made to FIGS. 1, 5, and 6. In the specific embodiment shown, each bolt 18 extends through a connecting flange 56, situated at first side member end 26 of a side member 22 of first section 14, and a gripping member 14, situated adjacent connecting flange 56, of a first side member end 26 of adjacent side member 22 of second section 16. Connecting flange 56 extends away from side member 22 of first section 14 in the same direction as gripping members 34 thereof and in substantially parallel alignment therewith. However, it should be noted that any positioning of connection means that enables pivotal folding of sections 14, 16 relative one another while connecting the sections 14, 16 together may be deployed. Similarly, other mechanisms and means than bolts 18 may be deployed as connection means. For example, connection means could also be an axle extending across sections 14, 16 and through all first side member ends 26 thereof, with the axle being securely fixed in place on respective axle ends thereof, in which case sections 14, 16 could be pivotally folded and unfolded relative each other on axle, which would define axis 50. Alternatively, connection means could be screws and nuts by which side members 22 are attached in a manner similar to that described herein for bolts.

Referring now to FIGS. 2, 3, 4, and 5, for increased safety, device 10 may have optional stopper means which limits pivotal folding and unfolding of sections 14, 16 to the folded and unfolded configurations 12, 42. Otherwise, sections 14, 16 could be folded into a configuration in which gripping members 34, and their respective gripping ends 36, of each section 14, 16 extend away from their adjacent side members 22 of the other section 14, 16, i.e. protruding outwardly away from both sections 14, 16. This would greatly increase the risk, especially during carriage and storage of device 10, of gripping members 34 ends 36 accidentally coming into contact with persons or foreign objects and causing damage thereto. Further, as best illustrated in FIG. 2, as wheel approaches first side member ends 26 while traversing sections 14, it is possible that force generated by mass of wheel 40, and vehicle may push first side member ends 26, situated in proximity to connection means 18, towards ground surface 44. As second section 16 can pivot relative first section 14 on axis 50 defined by connection means 18, it is therefore possible that the force exerted by wheel could cause, as first section 14 is forced thereby towards ground surface 44, second section 16 to pivot away from ground surface 44 towards wheel 40 possibly causing damage thereto or to vehicle.

As best shown in FIGS. 1, 4, 5, and 6, in general, stopper means includes at least one abutting stopper protrusion 54 disposed on a first side member end 26, or in proximity thereto, of at least one section 14, 16. As best shown in FIGS. 2 and 5, abutting stopper protrusion 54 is configured, e.g. sized, positioned and/or shaped, such that, as sections 14, 16 are folded toward each other to fold device 10 from unfolded configuration 12 into folded configuration 42, stopper protrusion 54 is pivoted away, in direction D, from an adjacent first side member end 26 of another, adjacent side member 22, of the other section 14, 16, situated adjacent to side member 22 to which stopper protrusion 54 is connected. Conversely, as best shown in FIGS. 4 and 6, as sections 14, 16 are unfolded away from each other when device 10 is unfolded into unfolded configuration 12, stopper protrusion 54 is pivoted opposite direction D, i.e. in direction E, towards adjacent side member end 26 until device 10 is in unfolded configuration 12, in which stopper protrusion 54 rigidly abuts adjacent first member end 22. Thus, further pivoting of adjacent side member 22, in direction E, towards or beyond stopper protrusion 54 is prevented. Further unfolding of adjacent side member 22, and thereby sections 14, 16 beyond unfolded configuration 12 is therefore prevented.

For the specific embodiment shown, stopper means consists of two stopper protrusions 54, one for each side member 22 of second section 16, which protrude outwardly from respective outside surfaces 32 in proximity to respective first member end 26 thereof. As best shown by FIGS. 1 and 6, stopper protrusions 54 are configured for abutting first side member end 26 of side members 22 of first section 14 when device 10 is in unfolded configuration 12. As first side member ends 26 of first section 16 are pivoted in direction E towards first side member ends 26 of second section 16 during pivotal folding of sections 14, 16 together to fold device 10 into folded configuration 42 from unfolded configuration 12, stopper protrusions 54 are 26 pivoted in direction E towards first side member end 26 of first section 14 until unfolded configuration 12 is reached. Since first member end edges 22 of first section 14 abut stopper protrusion 54 once device 10 reaches unfolded configuration 12, further rotation of first side members 22 of second section 16 in direction E towards first side members 22 of first section 14 is no longer possible. Accordingly, pivotal unfolding of sections 14, 16 beyond unfolded configuration 12 is prevented. However, as shown in FIGS. 4 and 5, rotation of section 16 in direction D remains unimpeded by stopper protrusion 54, thus allowing sections 14, 16 to be pivotally folded together from unfolded configuration 12 into folded configuration 42. It should be noted that stopper means need not be limited to stopper protrusions 54 shown for the specific embodiment illustrated and described herein. In fact any means capable of preventing unfolding of sections 14 from folded configuration 42 beyond unfolded configuration 12 may be deployed.

Referring again to FIGS. 1 and 2, to facilitate initial engagement of wheel 40 upon device 10, second side members of one section 14, 16, shown as first section 14 in the FIGS. 1 and 2, may optionally be tapered towards each other at respective tapering positions 66 proximal respective second member ends 28 thereof to define an optional tapered end portion 62 extending between respective tapering positions 66 on each side member of first section 14 and second side member ends 28 thereof. Side members 22 are disposed substantially parallel one another for the remaining, straight portion 64 of first section 14 when optional tapered end portion 62 is present. For tapered end portion, each side member 22 of section 16 is configured in proximity to respective tapering position 66 such that, throughout tapered end portion 62, at least one of inside surface 30 or outside surface 32 faces towards tire 50 and extends substantially parallel to ground surface 44 when device 10 is deployed on ground surface 44 in unfolded configuration 12. As shown, side members 22 of section 14, which are configured in straight portion 64 to extend upwardly away from ground surface 44 when device 10 is deployed thereon in unfolded configuration 12, are twisted at tapering position 66, to dispose inside surface 30 substantially parallel to ground surface 44. Wheel engagement flanges 70 of tapered end portion 62 are situated at second side member ends 28 of first section 14 and extend away therefrom, generally opposite gripping members 34. Thus, wheel engagement flanges 70 are configured to extend away from side members 22 thereof towards wheel 40 when device 10 is deployed on ground surface 44 in unfolded configuration 12 with gripping members 34 extending toward ground surface 44. To provide traction to wheel 40 while passing over tapered end portion 62, tapered end portion 62 has at least one tapered traction member 72 attached to and extending between side members 22 within tapered end portion 62. As with traction members 24 in straight portion 64, tapered traction member 72 is configured such that at least a portion thereof extends upwardly away, and preferentially substantially perpendicularly to, ground surface 44 when device 10 is deployed thereupon in unfolded configuration 12. More specifically, and as shown, tapered traction member 72 is attached to side member edges 38 extending between inside and outside surfaces 30, 32 and is twisted in proximity to each side member edge 38 to extend substantially perpendicular thereto. Thus, at least a portion of tapered traction member 72 extends substantially perpendicularly ground surface 44 when device 10 is deployed thereupon in unfolded configuration 12.

Referring now to FIGS. 2 and 3, when optional tapered portion 62 is present, device 10 is deployed in unfolded configuration 12 with gripping members 34 and ends 36 facing ground surface 44 and tapered portion flanges 70 in immediate, and preferably contacting proximity to wheel 40. As side members 22 are tapered towards second ends 38 in tapered end portion 62, second side member ends 28 and tapered portion flanges 70 are situated in increased proximity to each other compared to side members 22 in straight portion 64. This increased proximity of tapered portion flanges 70 and second side member ends 28 for tapered end portion 62 facilitates placement of device 10 relative wheel 40 such that both tapered portion flanges 70 are engageable thereby. As wheel 40 rolls over tapered portion flanges 70, which provide initial traction thereto, and onto side members 22 within tapered end portion 62, wheel 40 engages tapered traction member 72 which provides traction thereto as wheel 40 passes thereover towards wider straight portion 64. Thus tapered end portion 62 facilitates initial engagement of device 10 by wheel 40 and guides wheel 40 onto straight portion 64.

In general, device 10 is entirely composed of a resistant metal, such as iron, steel or the like, capable of supporting the mass of the vehicle and wheel 40 while wheel 40 is situated thereupon. However, other materials may be employed, provided they are capable of supporting this mass. Gripping members 34, traction members 24, and tapered traction members 72 are securely attached to side members 22, preferably by soldering members 24, 34, 72 thereto. However, gripping members 34, traction members 24, and tapered traction members 72 may be attached by other means, such as nuts, bolts, screws, adhesives, or the like, provided that, members 24, 34, 72 will remain securely attached when mass of vehicle and wheel 40 is applied to device 10 while wheel 40 rolls thereover.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

I claim:

1. A traction aid device for a wheel of a vehicle, said device comprising:

two generally planar sections, each section having two respective side members with at least one respective traction member extending therebetween and engageable by a wheel to provide traction thereto relative a ground surface;

connecting means pivotally connecting said sections to one other and enabling pivotal folding and unfolding thereof between, respectively, an unfolded configuration of said traction aid device, wherein said sections are unfolded end-to-end opposite one another on said surface, and a folded configuration of said traction aid device, wherein said sections are folded together;

for each respective side member of each section, at least one respective gripping member attached thereto and having a respective gripping end, said gripping member extending from said respective side member to said gripping end for grippingly protruding into said ground surface in said unfolded configuration, said respective gripping end being situated, when said traction aid device is in said folded configuration, alongside an adjacent said respective side member, of the other section with the adjacent said respective side member of the other section extending beyond said gripping end; and for each respective gripping member of one said section, a respective gripping member abutment protrusion, attached to said respective gripping member intermediate said respective side member and said gripping end, for abutting said adjacent said side member when said traction aid device is in said folded configuration.

2. The traction aid device of claim 1, wherein said sections extend substantially planarly parallel one another in said folded configuration.

3. The traction aid device of claim 1, wherein each respective traction member is attached to said respective side members by soldering thereto.

4. The traction aid device of claim 1, wherein, for each side member, each respective gripping member and each respective traction member are attached thereto spaced apart one another at different spaced apart longitudinal positions therealong.

5. The traction aid device of claim 1, wherein each respective gripping member is securely attached to said respective side member by soldering thereto.

6. The traction aid device of claim 1, wherein said traction member extends in a curved arc between said respective side members.

7. The traction aid device of claim 1, wherein said respective traction member is disposed substantially perpendicular to said respective side members from which said respective traction member extends.

8. The traction aid device of claim 1, wherein each side member has opposing respective inside and outside surfaces extending between generally longitudinally opposed respective first and second side member ends thereof, said traction members extending between said respective inside surfaces and being attached thereto.

9. The traction aid device of claim 8, wherein said sections are connected to each other by said connecting means at said respective first side member ends of said respective side members.

10. The traction aid device of claim 8, wherein at least a portion of each said respective inside and said outside surface of said respective side members of at least one of said section extend substantially perpendicular to said ground surface when said traction aid device is placed thereupon in said unfolded configuration.

11. The traction aid device of claim 8, wherein at least a portion of said respective traction member is disposed substantially perpendicular relative said respective inside surfaces and extends upwardly away therebetween from said ground surface when said traction aid device is placed thereupon in said unfolded configuration.

12. The traction aid device of claim 8, wherein one said section comprises a tapered end portion in which said second respective second side member ends of said respective side members are tapered towards one each other.

13. The traction aid device of claim 12, wherein, for each said respective side member of said tapered end portion, at least one said respective first and second side member surface is disposed parallel to said ground surface throughout said tapered end portion when said sections are in said unfolded configuration.

14. The traction aid device of claim 13, wherein said tapered end portion comprises at least one tapered traction member, said tapered traction member being attached to said respective side members and extending therebetween, at least a portion of said tapered traction member extending upwardly away relative said ground surface when said traction aid device is placed in said unfolded configuration thereupon.

15. The traction aid device of claim 13, wherein said tapered end portion comprises two tapered portion flanges for placement in proximity to said wheel prior to passage of said wheel over said traction aid device for providing traction thereto when said wheel initially engages said traction aid device, said tapered flanges extending upwardly away relative said ground surface when said traction aid device is placed thereupon in said unfolded configuration.

16. The traction aid device of claim 8, wherein said connecting means comprises two bolts, each respective side member of one said section and an adjacently situated said respective side member of another said section being pivotally connected to one another by a respective said bolt extending through said respective first side member ends thereof.

17. The traction aid device of claim 8, further comprising a stopper means for stopping further pivotal unfolding of said sections away from said folded configuration when said sections are in said unfolded configuration.

18. A traction aid device for a wheel of a vehicle, said device comprising:
- two generally planar sections, each section having two respective side members with at least one respective traction member extending therebetween and engageable by a wheel to provide traction thereto relative a ground surface;
- connecting means pivotally connecting said sections to one other and enabling pivotal folding and unfolding thereof between, respectively, an unfolded configuration of said traction aid device, wherein said sections are unfolded end-to-end opposite one another on said surface, and a folded configuration of said traction aid device, wherein said sections are folded together;
- for each respective side member of each section, at least one respective gripping member attached thereto and having a respective gripping end, said gripping member extending from said respective side member to said gripping end for grippingly protruding into said ground surface in said unfolded configuration, said respective gripping end being situated, when said traction aid device is in said folded configuration, alongside an adjacent said respective side member, of the other section with the adjacent said respective side member of the other section extending beyond said gripping end, wherein each side member has opposing respective inside and outside surfaces extending between generally longitudinally opposed respective first and second side member ends thereof, said traction members extending between said respective inside surfaces and being attached thereto, and said respective gripping members are attached to said inside surface for one said section and to said outside surface for another said section.

19. A traction aid device for a wheel of a vehicle, said device comprising:
- two generally planar sections, each section having two respective side members with at least one respective traction member extending therebetween and engageable by a wheel to provide traction thereto relative a ground surface, each side member having opposing respective inside and outside surfaces extending between generally longitudinally opposed respective first and second side member ends thereof, each said respective traction member extending between said respective inside surfaces and being attached thereto;
- connecting means pivotally connecting said sections to one other and enabling pivotal folding and unfolding thereof between, respectively, an unfolded configuration of said traction aid device, wherein said sections are unfolded end-to-end opposite one another on said surface, and a folded configuration of said traction aid device, wherein said sections are folded together;
- for each respective side member of each section, at least one respective gripping member attached thereto and having a respective gripping end, said gripping member extending from said respective side member to said gripping end for grippingly protruding into said ground surface in said unfolded configuration, said respective gripping end being situated, when said traction aid device is in said folded configuration, alongside an adjacent said respective side member, of the other section with the adjacent said respective side member of the other section extending beyond said gripping end; and
- at least one stopper protrusion protruding outwardly from said respective outside surface of one said respective first side member end of one said respective side member, said stopper protrusion abutting said respective first end of an adjacent said respective side member of another said section when said sections are in said unfolded configuration for preventing, when said traction aid device is in said unfolded configuration, further pivotal unfolding of said sections beyond said unfolded configuration.

* * * * *